(12) United States Patent
Driessen et al.

(10) Patent No.: US 8,659,470 B2
(45) Date of Patent: Feb. 25, 2014

(54) APPARATUS FOR ESTIMATING THE HEIGHT AT WHICH A TARGET FLIES OVER A REFLECTIVE SURFACE

(75) Inventors: Hans Driessen, Goor (NL); Martin Podt, Holten (NL)

(73) Assignee: Thales Nederland B.V., Hengelo (NL)

( * ) Notice: Subject to any disclaimer, the term of this patent is extended or adjusted under 35 U.S.C. 154(b) by 477 days.

(21) Appl. No.: 12/638,755

(22) Filed: Dec. 15, 2009

(65) Prior Publication Data

US 2010/0149021 A1 Jun. 17, 2010

(30) Foreign Application Priority Data

Dec. 17, 2008 (EP) .................................... 08172016

(51) Int. Cl.
*G01S 13/46* (2006.01)

(52) U.S. Cl.
USPC ......................................................... 342/123

(58) Field of Classification Search
USPC ......................................................... 342/123
See application file for complete search history.

(56) References Cited

U.S. PATENT DOCUMENTS

| | | | |
|---|---|---|---|
| 5,278,564 A * | 1/1994 | Groenenboom | 342/123 |
| 5,371,503 A | 12/1994 | Bower | |
| 7,046,188 B2 * | 5/2006 | Zaugg et al. | 342/95 |
| 7,626,535 B2 * | 12/2009 | Ding et al. | 342/95 |
| 2006/0224318 A1 * | 10/2006 | Wilson et al. | 701/213 |
| 2008/0120031 A1 * | 5/2008 | Rosenfeld et al. | 701/220 |

FOREIGN PATENT DOCUMENTS

GB 2094586 A 9/1982

OTHER PUBLICATIONS

Flament et al. "Particle Filter and Gaussian-Mixture Filter Efficiency Evaluation for Terrain-Aided Navigation". 12th European Signal Processing Conference, pp. 605-608, Vienna (Austria), Sep. 6-10, 2004.*

* cited by examiner

*Primary Examiner* — Matthew M Barker
(74) *Attorney, Agent, or Firm* — Stroock & Stroock & Lavan LLP

(57) ABSTRACT

An apparatus for estimating a height at which a target flies over a reflective surface. The apparatus includes means for emitting a signal, and means for receiving signals, including the emitted signal after it has been echoed by the target. The apparatus also includes a height estimator configured to estimate the height by utilizing a direct signal coming directly from the target after the emitted signal has been echoed by the target, an indirect signal coming indirectly from the target after the emitted signal has been echoed by the target and has been reflected by the surface, and reflection parameters including at least one of an amplitude of a reflection coefficient of the surface and a phase difference between the direct signal and the indirect signal. The height estimator comprises a particle filter configured to dynamically estimate the reflection parameters.

6 Claims, 2 Drawing Sheets

Figure 1:
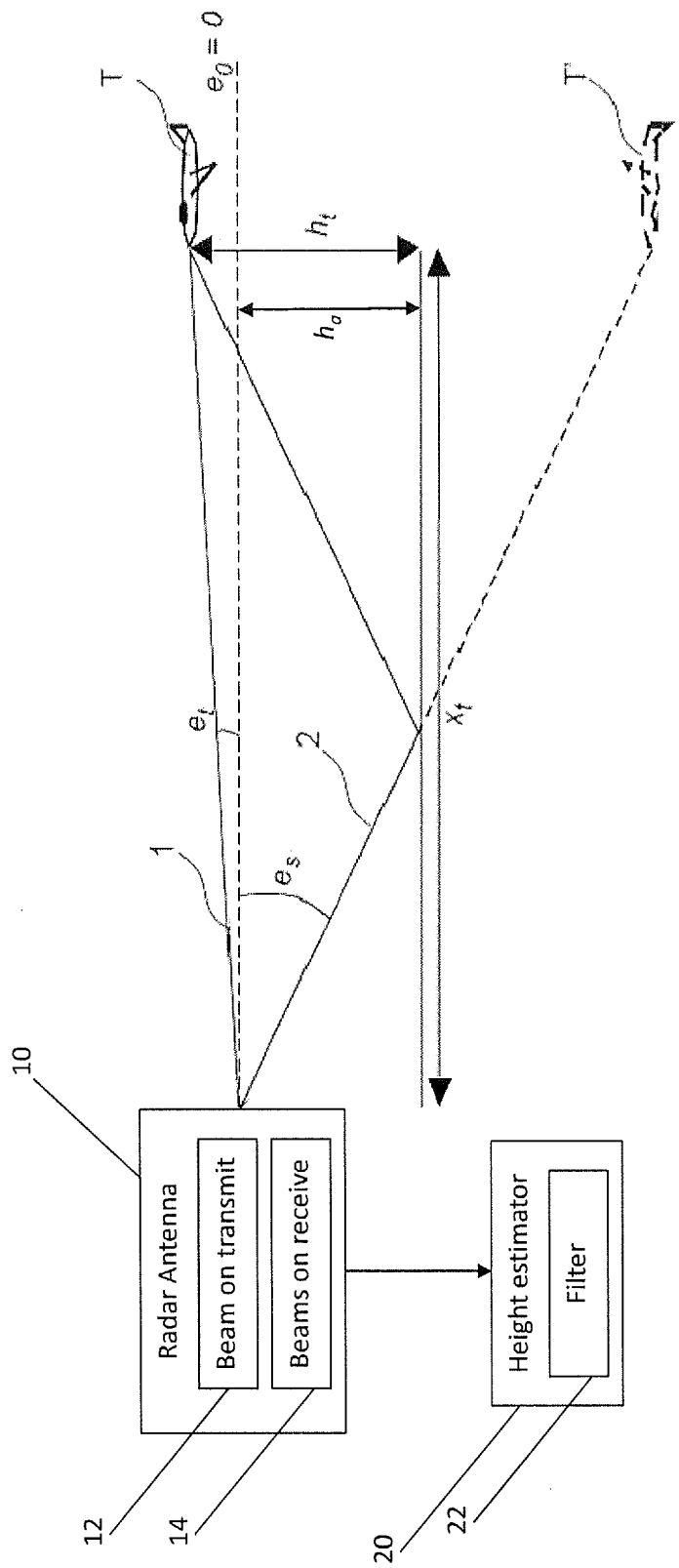

APPARATUS FOR ESTIMATING THE HEIGHT AT WHICH A TARGET FLIES OVER A REFLECTIVE SURFACE

CROSS REFERENCE TO RELATED APPLICATIONS

The present application claims priority to European Patent Application Serial No. 08172016.1, filed on Dec. 17, 2008, which is hereby incorporated by reference in its entirety.

TECHNICAL FIELD

The present invention relates to an apparatus for estimating the height at which a target flies over a reflective surface. The invention is particularly applicable to tracking radars. However, other potential fields of use may include surveillance radars and Global Positioning Systems.

PRIOR ART AND TECHNICAL PROBLEM

Several techniques have been tested in the past in an attempt to estimate the height of a target (or its elevation angle) flying over a reflective surface. Unfortunately, a technical problem that people failed at solving is how to prevent large multipath errors. Multipath errors are the errors in the estimated height or elevation that occur due to interferences between a direct signal from the target to the radar and an indirect surface-reflected signal.

A first technique tested in the past consists in using a narrow beamwidth. This technique is based on an antenna with a narrow beam. A narrow beam reduces the target elevation angle at which the reflective surface is illuminated by the radar. Consequently, the elevation angle below which severe multipath errors occur is reduced. However, a major drawback of this technique is that a narrow beamwidth is not always feasible due to technical limitations. In addition, although a narrow beamwidth can improve the target height estimation of a radar in multipath conditions, other radar functions benefit from a wider beamwidth. Yet another drawback of using a narrow beamwidth is that it does not practically work when the target is very close to the reflective surface.

Another technique tested in the past consists in trying to solve the problem of large multipath errors in the track filtering. This technique takes the corruption in the instantaneous angle estimate for granted and applies some form of track filtering to mitigate the worst errors. However, a major drawback is that it is difficult to stochastically characterize the error in the measurement of the elevation angle, thus resulting in a lack of accuracy. Another drawback is that part of, the information included in the measurements is neglected.

Yet another technique is commonly known as the symmetric beam ratio concept. The concept is based on two antenna beam patterns of which the ratio is symmetric. If the symmetry point lies at the reflecting surface, the direct and indirect signals produce the same output and multipath errors are eliminated. However, a major drawback is that, compared to a classical tracking radar, it requires at least three beams. In addition, the symmetry point of the beam ratio has to be pointed exactly in between the target and its reflected image in multipath mode, while in free space mode the antenna of a tracking radar is desired to be pointed at the target. This introduces a switching problem between pointing modes of the beams. In addition, this technique generates a biased estimate of the elevation angle, especially for low signal-to-noise ratios. This bias error cannot be reduced by track filtering.

Other techniques, commonly known as complex angle techniques, use the complex ratio (the ratio of both the in-phase and the quadrature components) of the output signals of a monopulse radar in combination with a reflection model. Indeed, in free space the monopulse signal ratio has no quadrature component: a quadrature component of the monopulse signal ratio is an indication of multipath. However, a major drawback of these techniques is that they are sensitive to deviations between the actual diffused reflections at the real surface and the assumed theoretical specular reflection, i.e. in a single direction. Moreover, they require accurate prior knowledge of the reflection parameters of the reflective surface and of its geometry, which are generally not available. Yet another major drawback of these techniques is that, to solve the ambiguity in the height estimate, they require at least two measurements at different frequencies for a single point.

SUMMARY OF CLAIMS

The present invention aims to provide a radar apparatus which may be used to overcome at least some of the technical problems described above. In particular, the present invention proposes to dynamically estimate the reflection parameters. Thus, no prior knowledge of the amplitude of the reflection coefficient or of the phase shift at the reflective surface is required. At its most general, the invention proposes a method for estimating the height at which a target flies over a reflective surface. The method comprises a step of emitting a signal and a step of receiving signals, including the emitted signal after it has been echoed by the target. The method also comprises a step of filtering the received signals. The method also comprises a step of modeling a direct signal, coming directly from the target after the emitted signal has been echoed by the target, and of modeling an indirect signal, coming indirectly from the target after the emitted signal has been echoed by the target and has been reflected by the surface, based on reflection parameters including the amplitude of the reflection coefficient of the surface and/or the phase difference between the direct signal and the indirect signal. The step of filtering estimates dynamically the reflection parameters by use of a particle filter or a Gaussian-Sum filter.

In a preferred embodiment, the step of modeling may use a specular reflection model.

Advantageously, the emitted signal may be emitted at a constant frequency.

Another object of the invention is an apparatus for estimating the height at which a target flies over a reflective surface. The apparatus comprises means for emitting a signal and means for receiving signals, including the emitted signal after it has been echoed by the target. The apparatus comprises means for filtering the received signals. The apparatus also comprises means for modeling a direct signal coming directly from the target after the emitted signal has been echoed by the target, and for modeling an indirect signal coming indirectly from the target after the emitted signal has been echoed by the target and has been reflected by the surface, based on reflection parameters including the amplitude of the reflection coefficient of the surface and/or the phase difference between the direct signal and the indirect signal. The means for filtering comprise a particle filter or a Gaussian-Sum filter for estimating dynamically the reflection parameters.

In a preferred embodiment, the means for modeling may implement a specular reflection model.

Advantageously, the emitted signal may be emitted at a constant frequency.

ADVANTAGES

Thus, an advantage provided by the present invention in any of its aspects is that it allows the radar antenna to be pointed at the target, both in free space mode and in multipath mode. Consequently, there is no switching problem between pointing modes. Moreover, it is a cost-effective solution as it can be implemented as a software in existing systems, without requiring dedicated emission/reception devices.

DRAWINGS

Figure 2:
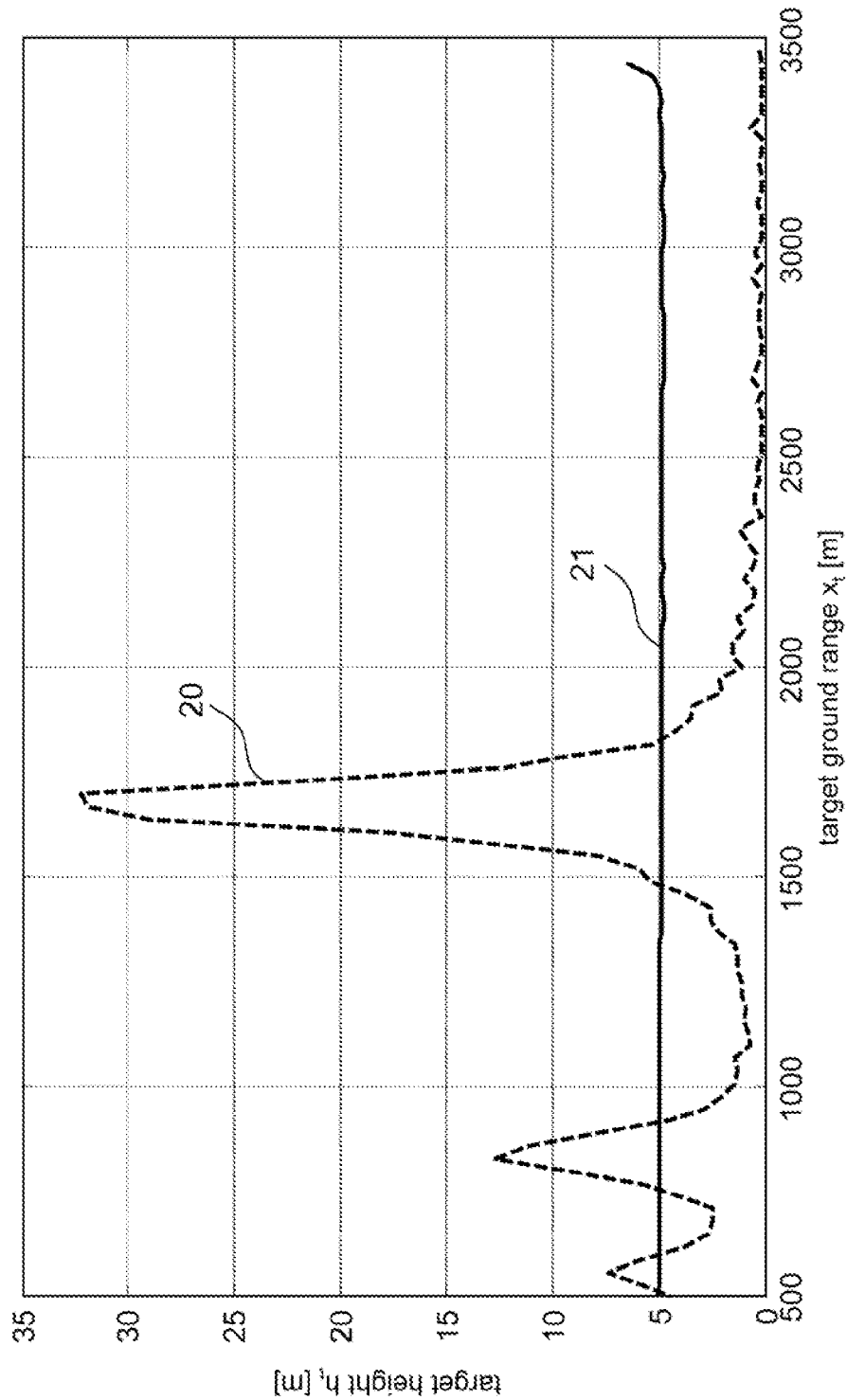

Non-limiting examples of the invention are described below with reference to the accompanying drawings in which:

FIG. 1 schematically illustrates an exemplary multipath propagation geometry;

FIG. 2 schematically illustrates exemplary target height estimates as a function of the target ground range.

DESCRIPTION OF INVENTION REFERRING TO FIGURES

The present invention proposes to use the complex output signals of a multibeam tracking radar, i.e. the in-phase and quadrature components of the signals. The present invention also proposes to solve the multipath problem by applying a dynamic reflection model. Advantageously, the application of particle filters or Gaussian-Sum filters to the complex signals of a multibeam tracking radar may allow the reflection parameters to be dynamically estimated. These filters receive raw data as input and enable to take into account the non-linearity of the modeling means.

FIG. 1 schematically illustrates a basic specular reflection model, which may be applied to implement the present invention. A target T illuminated by the beam of a radar echoes a direct signal (1) and an indirect signal (2). The indirect signal (2) leads to a specular image T'. Implementation of the invention depends on the number N of elevation beams available in the multibeam radar (N>1). The basic embodiment can be implemented in a standard monopulse radar. The monopulse radar (not illustrated) comprises an antenna (10) of height $h_a$, the antenna (10) having a single beam on transmit (12). The beam on transmit (12) describes in what direction the energy is concentrated. The antenna (10) has at least two beams on receive (14). A beam on receive (14) describes the gain or amplification as a function of the direction of the received energy. Advantageously, the emission frequency can be constant, thus enabling measurements at a constant frequency. However, enhanced embodiments of the present invention can be implemented in radar systems whose antenna has more than two beams on receive (N>2). Referring to FIG. 1, the present invention aims at estimating, with respect to an elevation angle $e_0=0$ at which the antenna (10) points, the elevation angle $e_t$ or the height $h_t$ over a reflective surface S of the target T located at a ground range $x_t$ from the antenna. Thus, the direct signal (1) is the energy that is measured for the elevation angle $e_t$ corresponding to the direct path between the antenna (10) and the target T, and vice versa. The indirect signal (2) is the energy that is measured for an elevation angle $e_s$ corresponding to the indirect, surface-reflected, path between the target T and the antenna. A height estimator (20) receives raw data from the radar system and uses a filter (22) to dynamically determine the reflection parameters.

For the multipath propagation geometry as shown in FIG. 1, the output of the radar system based on the two beams on receive can be written as in the following equation (1):

$$\begin{bmatrix} z_1 \\ z_2 \end{bmatrix} = \begin{bmatrix} a_1(e_t - e_0) & a_1(e_s - e_0) \\ a_2(e_t - e_0) & a_2(e_s - e_0) \end{bmatrix} \begin{bmatrix} q_t \\ q_s \end{bmatrix} + \begin{bmatrix} n_1 \\ n_2 \end{bmatrix}, \quad (1)$$

where:
- $z_i$ ($i \in \{1,2\}$) represent the signal output,
- $a_i$ ($i \in \{1,2\}$) represent the radar beam patterns,
- $n_i$ ($i \in \{1,2\}$) represent the thermal noise corresponding to the two beams on receive,
- $e_s$ is the elevation angle of the specular image T' of the target T,
- $q_t$ and $q_s$ are the complex amplitudes of echoes corresponding to target T and to its specular image T' respectively.

The complex amplitudes of the target T and its specular image T' are related by the following equation (2):

$$q_s = \rho_s \exp(j\phi) q_t \quad (2)$$

where:
- $\rho_s = |\rho_s| \exp(j\phi_s)$ is the complex reflection coefficient of the sea,
- $\phi$ is the phase difference between the direct (1) and indirect signal (2) due to the path length difference.

The phase difference $\phi$ is defined by the following equation (3):

$$\varphi = \frac{2\pi}{\lambda} \left( \sqrt{x_t^2 + (h_t - h_a)^2} - \sqrt{x_t^2 + (h_t + h_a)^2} \right), \quad (3)$$

where $\lambda$ is the radar wavelength. Substituting the above equations (2) and (3) into the equation (1) leads to the following detailed signal model (4):

$$z = (A(e_t, e_0) + A(e_s, e_0)\rho(h_t))q_t + n, \quad (4)$$

where:

$$A(e) = \begin{bmatrix} a_1(e) \\ a_2(e) \end{bmatrix} \quad (5)$$

$$\rho(h_t) = \rho_s \exp(j\varphi(h_t))$$

Equation (4) can be compressed into the following equation (6):

$$z = B(h_t)q_t + n \quad (6)$$

where $B(h_t) = A(e_t, e_0) + A(e_s, e_0)\rho(h_t)$.

Under the model given by equation (6) and assuming complex Gaussian observation noise n and exact prior knowledge, except for the target height $h_t$, the target ground range $x_t$, and the amplitude of the reflection coefficient $|\rho_s|$, the conditional likelihood on the data z can be written as in the following equation 7:

$$p(z/h_t, q_t, x_t, |\rho_s|) = \frac{1}{|\pi Q_n|} \exp\{-\tilde{z}^H Q_n^{-1} \tilde{z}\} \quad (7)$$

where $\tilde{z} = z - B(h_t)q_t$ and $Q_n = I\sigma_n^2$. In equation (7), the unknown instantaneous complex target amplitude $q_t$ is still present. However, by assuming that the variable is complex Gaussian distributed with variance $\sigma_1^2$, the likelihood function can be written as in the following equation (8):

$$p(z/h_t, \sigma_t^2, x_t, |\rho_s|) = \frac{1}{|\pi Q_z|}\exp\{-z^H Q_n^{-1} z\} \quad (8)$$

where:

$$Q_z = B(h_t)(B(h_t))^H \sigma_t^2 + I\sigma_n^2 \quad (9)$$

In the present embodiment, the likelihood function given by equation (8) may advantageously be implemented in a particle filter algorithm such as described by B. Ristic et al in « *Particle filters for tracking applications* » (Artech House, Boston, Mass., 2004), thus enabling to combine the information in the data from measurement to measurement. The particle filter cannot only be used to estimate the target height $h_t$, the target strength, the target position and the target velocity. It can also advantageously be used to estimate the target variance $\sigma_t^2$, the target ground range $x_t$, the reflection coefficient amplitude $|\rho_s|$ and the phase difference between direct (1) and indirect signal (2). The reflection parameters are dynamically estimated under the assumption that these parameters are slowly varying in time. Besides, the phase $\phi_s$ of the complex reflection coefficient (equation 2) can be calculated by a reflection model such as described by P. Beckmann e, al in « *The scattering of electromagnetic waves from rough surfaces* » (Artech House, Norwood, 1987).

FIG. 2 schematically illustrates exemplary estimates of the target height $h_t$ (in meters) as a function of the target ground range $x_t$ (in meters). The true target height is 5 meters above the sea. The input data is simulated with a signal-to-noise ratio of 40 decibels and an antenna height $h_a$ equal to 5 meters. The radar wavelength $\lambda$ is equal to 0.03 meter.

A broken-lined curve 20 represents the height as estimated by a standard monopulse estimate. The broken-lined curve 20 shows large errors in the monopulse estimates, especially for ground ranges from 1500 to 2000 meters. A solid-lined curve 21 represents the height as estimated by the invention. The solid-lined curve 21 shows accurate estimates of the target height, whatever the ground range.

The invention claimed is:

1. An apparatus for estimating a height at which a target flies over a reflective surface, the apparatus comprising:
    means for emitting a signal;
    means for receiving signals, including the emitted signal after it has been echoed by the target; and
    a height estimator configured to estimate the height by utilizing:
        a direct signal coming directly from the target after the emitted signal has been echoed by the target;
        an indirect signal coming indirectly from the target after the emitted signal has been echoed by the target and has been reflected by the surface, and
        reflection parameters including at least one of an amplitude of a reflection coefficient of the surface and a phase difference between the direct signal and the indirect signal;
    wherein the height estimator comprises a particle filter configured to dynamically estimate the reflection parameters, said particle filter being used to estimate the height.

2. An apparatus according to claim 1, wherein the height estimator implements a specular reflection model.

3. An apparatus according to claim 1, wherein the emitted signal is emitted at a constant frequency.

4. A method for estimating the height at which a target flies over a reflective surface, the method comprising:
    a step of emitting a signal;
    a step of receiving signals, including the emitted signal after it has been echoed by the target; and
    a step of estimating the height, based upon:
        a direct signal coming directly from the target after the emitted signal has been echoed by the target;
        an indirect signal coming indirectly from the target after the emitted signal has been echoed by the target and has been reflected by the surface, and
        reflection parameters including an amplitude of a reflection coefficient of the surface and a phase difference between the direct signal and the indirect signal;
    wherein the step of estimating the height comprises dynamically estimating the reflection parameters by use of a particle filter, said particle filter enabling estimation of the height.

5. A method according to claim 4, wherein the estimating step uses a specular reflection model.

6. A method according to claim 4, wherein the emitted signal is emitted at a constant frequency.

* * * * *